(12) United States Patent
Casabona et al.

(10) Patent No.: US 7,660,374 B2
(45) Date of Patent: Feb. 9, 2010

(54) METHOD AND APPARATUS FOR EXCISION OF NARROWBAND INTERFERENCE SIGNALS IN NAVIGATION OR COMMUNICATION BANDS

(75) Inventors: Mario M. Casabona, Cedar Grove, NJ (US); Murray W. Rosen, Paralppany, NJ (US); Ilya Kovnatsky, Southampton, PA (US); David Van Alstine, Midland Park, NJ (US)

(73) Assignee: Honeywell International Inc., Morristown, NJ (US)

( * ) Notice: Subject to any disclaimer, the term of this patent is extended or adjusted under 35 U.S.C. 154(b) by 694 days.

(21) Appl. No.: 11/133,225

(22) Filed: May 20, 2005

(65) Prior Publication Data

US 2005/0259760 A1 Nov. 24, 2005

Related U.S. Application Data

(60) Provisional application No. 60/572,952, filed on May 21, 2004.

(51) Int. Cl.
*H04B 1/10* (2006.01)
(52) U.S. Cl. .................. 375/346; 375/144; 375/148
(58) Field of Classification Search ............ 375/260, 375/144, 148, 346
See application file for complete search history.

(56) References Cited

U.S. PATENT DOCUMENTS

| | | | |
|---|---|---|---|
| 5,263,048 A * | 11/1993 | Wade | 375/148 |
| 5,712,641 A | 1/1998 | Casabona et al. | |
| 5,822,429 A | 10/1998 | Casabona et al. | |
| 5,872,540 A | 2/1999 | Casabona et al. | |
| 6,407,699 B1 * | 6/2002 | Yang | 342/357.12 |
| 7,277,475 B1 * | 10/2007 | Nguyen et al. | 375/148 |
| 2003/0053524 A1 * | 3/2003 | Dent | 375/148 |

* cited by examiner

*Primary Examiner*—Shuwang Liu
*Assistant Examiner*—David Huang
(74) *Attorney, Agent, or Firm*—Fogg & Powers LLC (57) ABSTRACT

A narrowband interference excision and nulling system for Global Positioning Satellite (GPS), spread spectrum navigation and communication bands, and an antijam electronic apparatus that operates using RF conversion and digital signal processing. A band containing the signal of interest as well as interference is converted to an intermediate frequency (IF) for RF filtering using single conversion, and this signal is digitized using an analog-to-digital converter (ADC). A representation of the signal is produced at a lower frequency using digitization and filtering, and a continuous data representation of the band is processed using multiple-point samples to define the input to a complex FFT. The FFT produces contiguous frequency bins that are examined to identify narrowband and broadband interference. An excision algorithm determines the optimum pattern of bins to be removed, after which the residual bins are reconstructed using an IFFT, followed by digital-to-analog conversion and RF conversion to the output band. Narrowband interference excision can be integrated with two-port broadband suppression in cascade using a masked variable resolution FFT spectral energy detection receiver.

15 Claims, 8 Drawing Sheets

METHOD AND APPARATUS FOR EXCISION OF NARROWBAND INTERFERENCE SIGNALS IN NAVIGATION OR COMMUNICATION BANDS

This application is entitled to and hereby claims the priority of U.S. provisional application Ser. No. 60/572,952 filed May 21, 2004.

FIELD OF THE INVENTION

The present invention relates to interference suppression systems and methods and, more particularly, to method and apparatus for excising narrowband interference signals in navigation and communication bands.

SUMMARY OF THE INVENTION

The present invention is directed to a narrowband interference excision and nulling system for Global Positioning Satellite (GPS), spread spectrum navigation and communication bands, and to an antijamming electronic apparatus that operates using RF conversion and digital signal processing.

A bank of narrowband filters is implemented utilizing a continuous Fast Fourier Transform (FFT) process at a baseband. After excision the signal of interest is reconstructed using an Inverse FFT (IFFT). The invention implements digital signal processing in a Programmable Logic Device (PLD), Field Programmable Gate Array (FPGA) or Application Specific Integrated Circuit (ASIC) devices.

The present invention converts a band containing the signal of interest and interference to an intermediate frequency (IF) for RF filtering using single conversion, and digitizes this signal using an analog-to-digital converter (ADC). A representation of the signals is produced at a lower frequency using digitization and filtering. The invention processes a continuous data representation of the band using multiple-point samples to define the input to a complex FFT. Parallel FFT/IFFT channels use a 50-percent time overlap pipeline spectral process to optimize hardware and maximize continuous GPS signal throughput. The signal is windowed to reduce spectral broadening of interference signals inherent in the finite duration FFT. The FFT produces contiguous frequency bins that are examined to identify narrowband and broadband interference. An excision algorithm determines the optimum pattern of bins to be removed and the residual bins are reconstructed using an IFFT. The excision threshold is adaptively computed using bin and band statistical parameters and a narrowband mask to discriminate between narrowband interference and background. Integration with a two-port broadband suppression technique preceding narrowband excision closes the broadband suppression control loop using a lower resolution FFT analysis receiver to monitor broadband interference energy with narrowband signals removed. The control algorithm minimizes technique interaction and optimizes combined suppression of the two techniques. Reconstruction of the signal is accomplished by IFFT, digital-to-analog converter (DAC) and then RF conversion and filtering to the output band. Signal processing provides the output signal at RF, IF or quadrature (I/Q) digital format. Navigation/communication processing can be embedded as an algorithm inside of the excision process.

It is thus a general object of the invention to provide a narrowband interference rejection filter technique that suppresses narrowband interference in the GPS, satellite navigation and communication bands using spectral bin excision in digital signal processing.

It is another object of the present invention to provide an integrated broadband and narrowband interference suppression control that excises large narrowband interference signals above a broadband background, and sequentially/iteratively adjusts broadband suppression coefficients to reduce the broadband background level to reveal lower level narrowband signals that are subsequently excised.

A further object of the present invention is to provide a narrowband interference mitigation technique that excises multiple simultaneous narrowband interference signals covering up to a cumulative excised band totaling approximately one-half of the total information bandwidth.

Yet another object of the present invention is to provide an integrated broadband and narrowband interference suppression control that monitors changes to the broadband and narrowband suppression environment and adapts excision and suppression algorithms to maintain optimized excision.

Another object of the present invention is to provide an integrated broadband and narrowband interference suppression control that detects the suspension or reduction of interference levels and adapts excision and suppression algorithms to maximize GPS or communication band performance.

A still further object of the present invention is to provide a narrowband interference mitigation process that preserves GPS, navigation or communication signals with minimal degradation.

Yet another object of the present invention is to provide a narrowband interference mitigation process that can excise narrowband interference signals above the objective GPS, navigation or communications signals.

Another object of the present invention is to provide a narrowband interference rejection filter technique including a band filter, RF down conversion section, a digitizing section, continuous digital signal processing to an FFT spectral processor, a narrowband interference excision algorithm, IFFT processing back to time domain, conversion back to IF and RF, an FFT spectral analysis receiver of the environment for integrated narrowband/broadband suppression control, and integrated broadband suppression technique control.

A further object of the present invention is to provide a narrowband excision technique or applique that can pre-process the received signal environment, or be combined by cascading behind a wideband suppression technique using integrated interference detection and control processing.

A still further object of the present invention is to provide an interference mitigation approach that does not process the underlying GPS, navigation or communication signals, as well as a single RF conversion scheme that simplifies down and up RF conversion to a convenient processing IF.

Yet another object of the present invention is to provide a signal digitizing and processing scheme that preserves the GPS signals in C/A-code, P-code and M-code bandwidths in the GPS navigation bands.

Another object of the present invention is to provide a narrowband frequency excision implementation in digital signal processing using programmable Field Programmable Gate Array (FPGA), Programmable Logic Device (PLD) or Application Specific Integrated Circuit (ASIC) circuits and programmable signal processing composed of original design functions, library functions, and Intellectual Property (IP) functions.

Another object of the present invention is to provide a frequency excision implementation in digital signal processing using custom ASIC devices or hybrid FPGA/ASIC devices and programmable signal processing.

Another object of the present invention is to provide a frequency excision implementation that uses analysis and control processing to configure and manage high-speed digital signal processing.

Another object of the present invention is to provide a narrowband excision algorithm executed in system control processing or post-processing, or in digital signal processing firmware at high-speed.

Another object of the present invention is to provide an excision scheme that passes the GPS, navigation or communication signals and minimizes GPS or communication signal losses.

Another object of the present invention is to provide an interference suppression process that uses an adaptive control algorithm to adjust wideband suppression in the presence of changing or varying narrowband interferences.

Another object of the present invention is to provide an integrated suppression process that minimizes both narrowband and broadband interference.

Another object of the present invention is to provide an algorithm that detects and suppresses narrowband interference signals in the presence of wideband noise.

Another object of the present invention is to provide an algorithm that determines and suppresses wideband interference signals in the presence of multiple narrowband interference signals.

Another object of the present invention is to provide a control and suppression algorithm that optimizes wideband and narrowband suppression and excises wideband and narrowband interference in a combined interference environment.

Another object of the present invention is to provide an adaptive excision algorithm that adapts to varying uniform and non-uniform wideband noise levels.

Another object of the present invention is to provide a spectral processing and analysis technique that supports both narrowband and wideband interference detection, identification and suppression.

Another object of the present invention is to provide an RF down and up conversion scheme that can switch narrowband excision between the GPS, navigation and communication bands (e.g., L1, L2, etc.).

Another object of the present invention is to provide an RF down and up conversion scheme that can be configured as parallel narrowband excision channels for simultaneous excision in the GPS, navigation and communication bands (e.g., L1, L2, etc.).

Another object of the present invention is to provide a signal analog-to-digital conversion digitizing scheme that encodes the signal band of interest at a rate below the down converted IF and converts the signal information to a continuous digital data stream at a lower effective IF frequency for filtering and signal processing.

Another object of the present invention is to provide a digital signal processing arrangement that windows or weights the band of interest to minimize spreading in the frequency domain and minimizes excised bins.

Another object of the present invention is to provide a digital windowing scheme using a programmable look-up table definition of the coefficients and matrix multiplication of the data stream that can be modified for different windowing functions (e.g., Blackman-Harris, Blackman, Hamming, Kaiser, cosine, etc.).

Another object of the present invention is to provide techniques that apply a 50-percent time overlapping FFT/IFFT processing pipeline uses overlapping time samples of the digitized input signal to minimize weighting losses.

Another object of the present invention is to provide a high-speed digital signal pipeline process that reconstructs the input signal of interest into a contiguous output signal with interference removed or suppressed at a delay equal to the processing latency of the digital signal processing and FFT/IFFT sampling and conversion processes.

Another object of the present invention is to provide a high-speed digital signal process that supports continuous data throughput of input to output signal data at one hundred percent.

Another object of the present invention is to provide an integrated broadband and narrowband interference suppression control that excises large narrowband interference signals above a broadband background, and sequentially/iteratively adjusts broadband suppression coefficients to reduce the broadband background level to reveal lower level narrowband signals that are subsequently excised.

Another object of the present invention is to provide an integrated broadband and narrowband interference suppression control that monitors changes to the broadband and narrowband suppression environment and adapts excision and suppression algorithms to maintain optimized overall excision of interference.

Another object of the present invention is to provide an integrated broadband and narrowband interference suppression control that detects the suspension or reduction of interference levels and adapts excision and suppression algorithms to maximize GPS or communication band performance.

These and other objects of the present invention will become apparent when reference is made to the detailed description of preferred embodiments accompanied by the drawings.

DETAILED DESCRIPTION OF INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention, directed to the Frequency Interference eXcision (FIX) system, relates to narrowband interference excision and nulling in spread spectrum GPS, navigation and communication bands, and an antijam electronic apparatus that operates using RF conversion and digital signal processing. The invention uses a system that implements a bank of narrowband filters utilizing a continuous or back-to-back Fast Fourier Transform (FFT) at a baseband and reconstructs the signal of interest after excision using an Inverse FFT (IFFT).

Implementing digital signal processing residing in a Programmable Logic Device (PLD), Field Programmable Gate Array (FPGA) or Application Specific Integrated Circuit (ASIC) device, the present invention mixes the band or channel of interest, including the signal of interest and interference, to an intermediate frequency (IF) for RF filtering using a single conversion, and digitizes the signal using an analog-to-digital converter (ADC). A single conversion technique is used to efficiently translate the GPS band or channel of interest to a convenient 28 MHz bandwidth IF at 70 MHz. Sampling of the IF using a 56 MSPS ADC and filtering produce a ±14 MHz representation of the band of interest at a lower IF.

Figure 1:
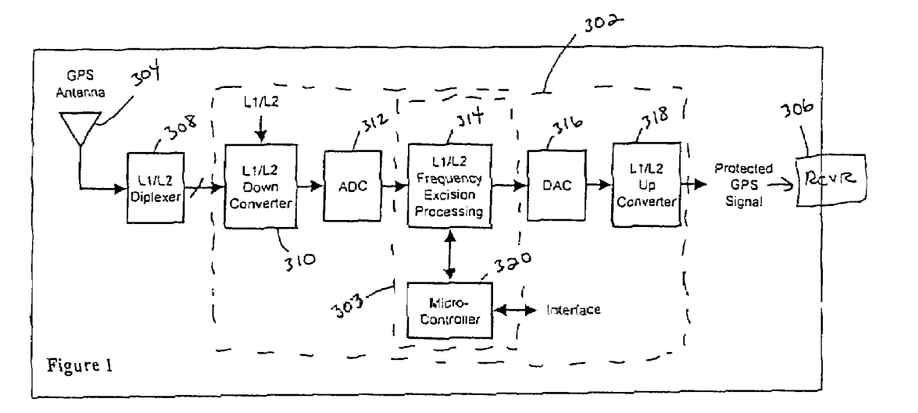
FIG. 1 is a top-level block diagram of the Frequency Interference eXcision (FIX) concept according to the present invention.

FIG. 1 is a top-level block diagram of the FIX concept, illustrating the arrangement of functions within the FIX system 302 when used as an applique between the GPS antenna 304 and the GPS receiver 306. The GPS signal is shown as received on a single wire or port and is amplified and filtered in an active diplexer 308 into L1/L2 component bands. The signals are preselected by local oscillator (LO) selection and down conversion to the 70 MHz IF by down converter 310. An ADC 312 digitizes the selected signal at 56 MSPS, moving the spectrum/band to 14 MHz. The signal is then processed by the FIX digital excision processing unit 314 and returned to the 70 MHz IF through a DAC 316, after which an up converter 318 mixes the excised signal back to RF. A microcontroller 320 is shown controlling the interference detection, excision and interface process.

Figure 2:
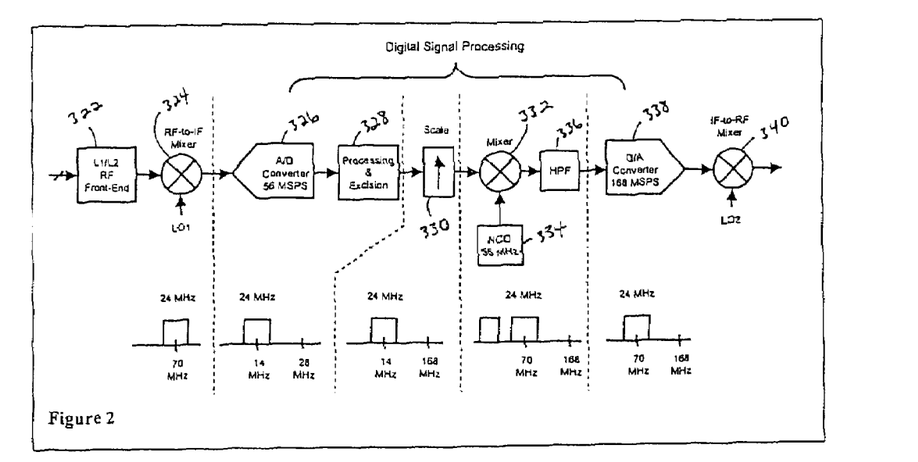
FIG. 2 is a graphic representation of the signal flow and frequency plan through the FIX process illustrating the spectral content at each stage of the processing.

FIG. 2 is a graphic representation of the signal flow and frequency plan through the FIX process illustrating the spectral content at each stage of the processing. After the L1/L2 RF filtering at the front end 322, the RF-to-IF mixer 324 converts the signal to 70 MHz IF with a bandwidth of 24 MHz. Anti-alias filtering removes unwanted components. The 56 MSPS ADC 326 samples the IF signal and results in a spectrally defined signal centered at 14 MHz with 2 MHz guard bands. Digital low pass filtering removes signal content above 28 MHz. Signal processing and excision are performed by the signal processing and excision unit 328 in digital processing at 168 MHz. The output of signal processing and excision unit 328 is scaled 330 to re-establish digital dynamic range at the 14 MHz center frequency. A digital mixer 332 using a Numerically Controlled Oscillator (NCO) 334 at 56 MHz then converts the signal back to the 70 MHz IF. A high pass filter 336 reduces the 168 MHz components. A DAC 338 at 168 MSPS then converts the signal to analog at 70 MHz, and an IF-to-RF mixer 340 converts the signal back to RF using the same LO selected for L1/L2.

The present invention collects a continuous data representation of the band using a finite sample of 256-points to define the input to a complex FFT. Multiple parallel FFT/IFF processing pipeline channels are used in combination with 50-percent time overlap pipeline spectral processing to optimize use of hardware and maximize continuous signal throughput for GPS. The input sampled signal is windowed/weighted to reduce spectral broadening of interference signals inherent in a finite duration FFT using a programmable Blackman-Harris function. The result of the FFT is a measure of energy in a number of contiguous frequency bins, and a representation of the sampled, combined, received signal.

Examination of the energy distribution in the bins is used to identify narrowband and broadband interference greater than the signal of interest or background noise level. An excision algorithm determines the optimum pattern of bins to be removed from the band. The residual bins are then reconstructed into the surviving signal using an IFFT. The present invention uses a pair of 50% overlapping FFTs operating in parallel to reduce weighting losses, and operates two overlapping FFT/IFFT channels back-to-back to provide continuous GPS signal processing. Frequency conversion techniques including RF mixing, digital decimation, digital frequency conversion, undersampling, etc. and filtering are used to define the band of interest. The present invention optimizes the interference excision threshold and mask by adaptively computing the bin and band statistical properties. Statistical properties of non-uniform shaped signal conditions can be used to develop excision decisions over subsets or segments of the band.

In the simplest case, a decision threshold is computed at a level above the mean for the band to discriminate between narrowband interference and broadband background. In more complex narrowband interference environments, thresholds are computed at n-sigma (e.g., 3-sigma) above the mean using a multi-bin rolling average process. This approach generally implements a single threshold across the band.

A linear excision approach can perform "n" FFTs and average the values for each bin. This averaged bin value is then used to create an "inverse multiply" matrix that equalizes the average energy in each bin. High bin values are therefore reduced to the level of the noise floor and those bins without interference are passed unmodified. Bins above a certain threshold are blocked (i.e., multipled by 0). The inverse multiply technique can equalize the noise level over the frequency band, compensating for noise shape, which can be detrimental to GPS signal processing. In the absence of jamming or when no interference is detected, then no excision occurs and the input is fed through to the output.

Figure 3:
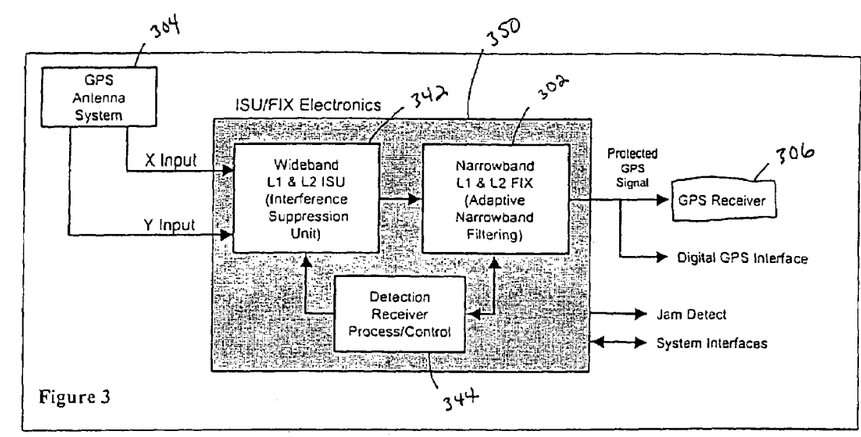
FIG. 3 is a top-level block diagram of the FIX integrated with a wideband interference suppression unit (ISU) as an applique between the GPS antenna and the GPS receiver.

The integration of narrowband excision with a multi-port broadband suppression technique, as shown in FIG. 3, expands the capability of the combined technique to address multiple simultaneous narrowband and broadband interference signals. An analog or digital broadband dual-port technique can precede the digital excision technique using an integrated control loop with a separate variable resolution FFT spectral analysis receiver to drive the broadband technique, and optimize suppression using a reference monitor signal with the narrowband interference signals removed. The digital broadband dual-port technique can precede the narrowband excision technique by the addition of a second RF conversion and digitization channel and inclusion of the broadband suppression algorithm into digital signal processing. Interaction between broadband and narrowband techniques requires digital excision to smooth the bin decision process, and also that iterative processing alternate between narrowband and broadband optimization. Reconstruction of the signal is accomplished by IFFT and then RF conversion to the output band. Signal processing provides the output signal to GPS, navigation or communication processing at RF, IF or quadrature (I/Q) digital format, or navigation/communication processing can be embedded as an algorithm within the excision process.

The architecture of the FIX system allows it to be used alone or as an applique for GPS, navigation or communication receivers as a pre-processor. As shown in FIG. 1, the FIX pre-processor is placed in series between the antenna and receiver to excise narrowband interference. The technique removes frequency segments of the spectrum containing interference from the total spectral band of application. Because the process correspondingly removes the signal as well as interference in the excised segments of the band, the FIX techniques cannot be used to remove interference that spans large partial band regions or is broadband in nature since it can degrade signal conditions by reducing signal.

Accordingly, when broadband interference is present, a companion broadband suppression technique may be incorporated with FIX. For these conditions, the FIX has been integrated with an inventive broadband Interference Suppression Unit (ISU) technique to expand capability to narrowband and broadband interference mitigation, as representatively shown in FIG. 3 and FIG. 4.

FIG. 3 is a top-level block diagram of the FIX system 302 integrated with a wideband ISU 342 as an ISU/FIX electronic unit 350 applique between the GPS antenna 304 and the GPS receiver 306. The wideband technique of the ISU 342 shown uses an RF interferometer technique having a two-port antenna interface. The FIX system 302 interfaces using a single output port of the ISU 342. A detection receiver and control unit 344 is shown that uses the signal processed by the FIX system 302 to control the ISU 342 where the FIX system 302 excises narrowband interference, and the control unit 344 optimizes the ISU 342 to suppress the residual wideband interference in the signal. Interaction between techniques is processed using an iterative algorithm in the control unit 344.

Figure 4:
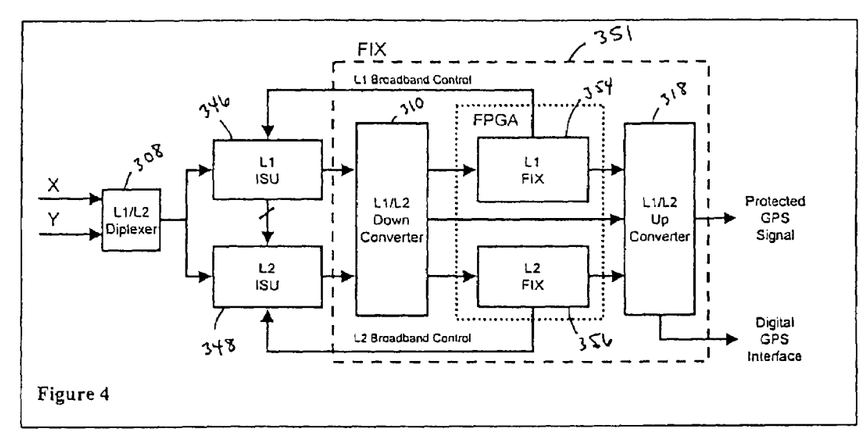
FIG. 4 is a block diagram of a parallel channel L1 and L2 configuration for an integrated ISU/FIX.

FIG. 4 is a block diagram of a parallel channel L1 and L2 configuration for an integrated ISU/FIX system 351. Parallel channels for L1 and L2, including L1 ISU 346, L2 ISU 348, L1 FIX 354, and L2 FIX 356, allow this configuration to operate on interference in each band independently and provide a protected L1/L2 GPS signal to the receiver without critical timing or interface between receiver and applique. This approach allows the integrated ISU/FIX system to support antijam without reacquisition cycles that would be needed in a shared or multiplexed configuration.

The broadband ISU technique can be implemented in analog RF preceding the FIX system, or implemented as a digital algorithm embedded with the FIX system in digital signal processing. Since ISU is a two-port cancellation technique, a digital implementation of ISU uses two RF/IF digitization channels. In either integrated ISU/FIX configuration, the FIX function is placed in cascade after the ISU function and integrates the interference detection and control functions between techniques for process synergy. In the latter approach, the detection and analysis receiver, control and excision functions execute on spectral data generated from received signals.

The FIX signal processing function handles the GPS L1 and L2 navigation or communication signals up to 24 MHz bandwidth at a 70 MHz IF and digitizes the signal using a 56 MSPS dual-ended analog-to-digital converter (ADC). The dynamic range of the signal conversion has been set to detect and process the GPS signal at threshold, maximizing jam signal head-room and linear operating range of interference to minimize compression, distortion and intermodulation products. Anti-alias filtering removes unwanted components. The FIX excision process is performed on the combined GPS and interference environment and is linear (small signal). The RF-to-IF and IF-to-RF conversion processing can be implemented as a switchable L1/L2 applique to minimize hardware and synchronize to GPS processing.

Figure 5:
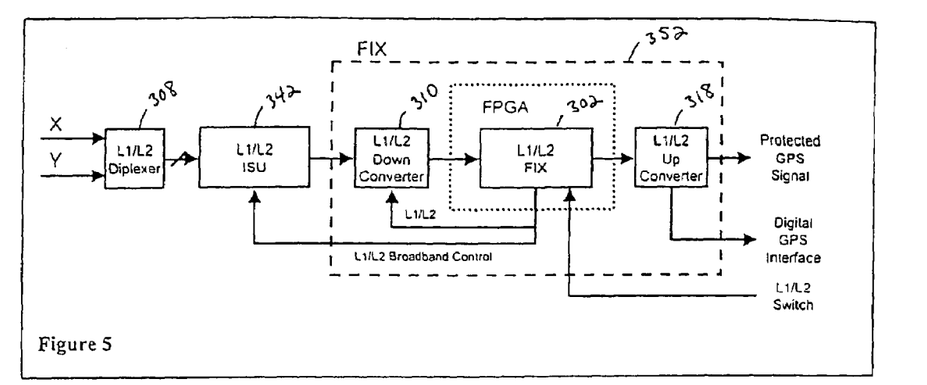
FIG. 5 is a block diagram of a multiplexed L1/L2 configuration for an integrated ISU/FIX.

FIG. 5 is a block diagram of a multiplexed L1/L2 configuration for an integrated ISU/FIX system 352. A multiplexed or switched L1/L2 channel synchronously switches with the GPS receiver, requiring an L1/L2 timing synchronization interface and added reacquisition and settling time at each transition. Alternatively separate parallel L1 and L2 channels may be used to maintain antijam operation independent of GPS receiver timing and multiplexing, as shown in FIG. 4.

Figure 6:
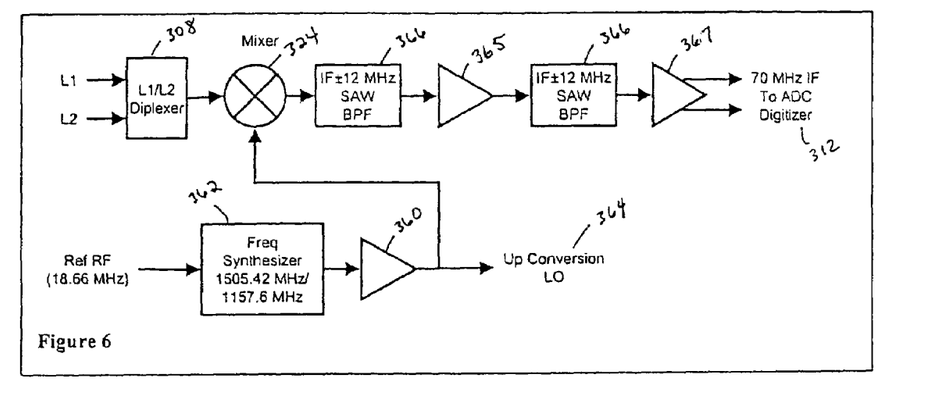
FIG. 6 is a block diagram of the RF-to-IF down conversion functions of the FIX.
Figure 7:
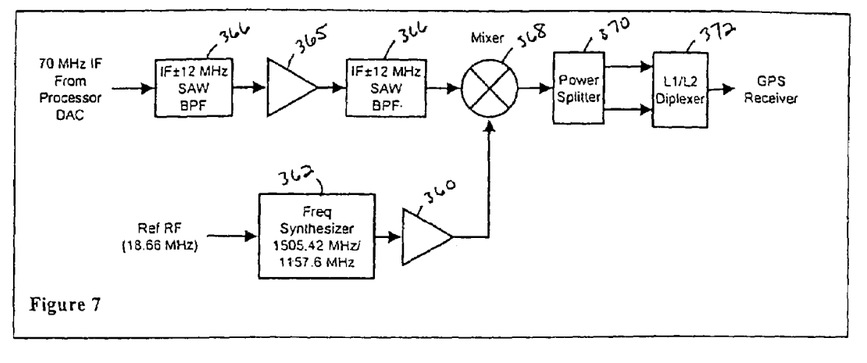
FIG. 7 is a block diagram of the matching IF-to-RF up conversion functions of the FIX.

Functional block diagrams of the down and up conversions from RF to the 70 MHz IF and vice versa are shown in FIG. 6 and FIG. 7, respectively. The conversion process can be switched between L1 and L2 for GPS in the shared configuration, or dedicated to L1 or L2 in a parallel configuration.

More particularly, FIG. 6 is a block diagram of the RF-to-IF down conversion functions of the FIX system. The active diplexer 308 filters and combines L1 and L2 inputs for mixing by mixer 324. Low noise amplifiers 360 help to establish the noise figure of the system. A frequency synthesizer 362 using a reference 18.66 MHz crystal signal generates the Local Oscillator (LO) signal 364 for conversion. Selection of the LO between 1,157.6 MHz and 1,505.42 MHz effectively pre-selects between L1 and L2 for conversion to a 70 MHz IF. Surface acoustic wave (SAW) bandpass filters (BPF) 366 set the bandwidth and rejection skirts for the IF channel. The channel uses a ±12 MHz BPF to set the GPS M-code processing bandwidth for the FIX system. SAW BPF losses are compensated using amplifier 365 for amplification at the 70 MHz IF. The output amplifier 367 provides the converted signal to ADC digitization using a common mode interface to minimize noise levels.

FIG. 7 is a block diagram of the matching IF-to-RF up conversion functions of the FIX system. The SAW BPFs 366 and IF amplifier 365 set the bandwidth of the IF channel coming out of the digital signal processing and digital NCO up conversion stage. The LO used for the channel is the same signal as that generated by the frequency synthesizer 362 in the down converter 310 and mixes the IF signal back to L1/L2 as selected for down conversion. The output of the mixer 368 is split by power splitter 370 and passed through a GPS L1/L2 diplexer 372 to filter the output signal provided to the GPS receiver 306.

When integrated with ISU broadband suppression, the combined ISU and FIX functions are cascaded, with the ISU function operating as a two-port interferometer canceller on broadband interference signals using a two-port GPS antenna system configured for spatial nulling or for polarization nulling. The ISU analog implementation suppression can be limited by broadband analog realization of components and designs. The digital implementation of ISU suppression performance according to the present invention can be closer to ideal in broadband performance limited by antenna and digitization non-linearity and distortion.

For the navigation antijam application, the FIX processing path consists of a programmable Blackman-Harris window, a 256-point FFT, an interference suppression block and an IFFT. The objective of the FIX function is to decompose the incoming signal spectrum into a 256-bin FFT covering up to a ±14 MHz band at IF. The process distinguishes interference from background noise and/or signal and excises the bins containing narrowband interference. The remaining or surviving signal containing the GPS signal is reconstructed back to IF and converted to RF for the GPS receiver. An alternate digital GPS output consisting of the GPS signal at complex I/Q baseband can be provided directly to a GPS receiver to drive GPS navigation processing, or the GPS navigation algorithm can be incorporated in FIX processing.

Each bin in the 256-bin FFT spectrum characterizes the energy in a 109.375 KHz cell. The down converted input signal at the 70 MHz IF is sampled at the 56 MSPS rate, which essentially translates the signal down to the difference frequency of 14 MHz where digital signal processing removes all aliased signals above 28 MHz. Since the intent of the FIX is to function on the GPS signal as an applique, the process is structured to process and reconstruct the incoming data stream as continuous back-to-back data samples without interruption. In this manner, the GPS signal is preserved with minor degradation. Sampling rate, dynamic range, levels and noise figures are selected to minimize GPS degradation of signals in the L1 and L2 bands. Much of the structure of the FFT/IFFT processing that follows in the discussion addresses the need to maintain a continuous data throughput using realizable and low-power ADC/DAC and digital signal processing components and clock rates.

Figure 8:
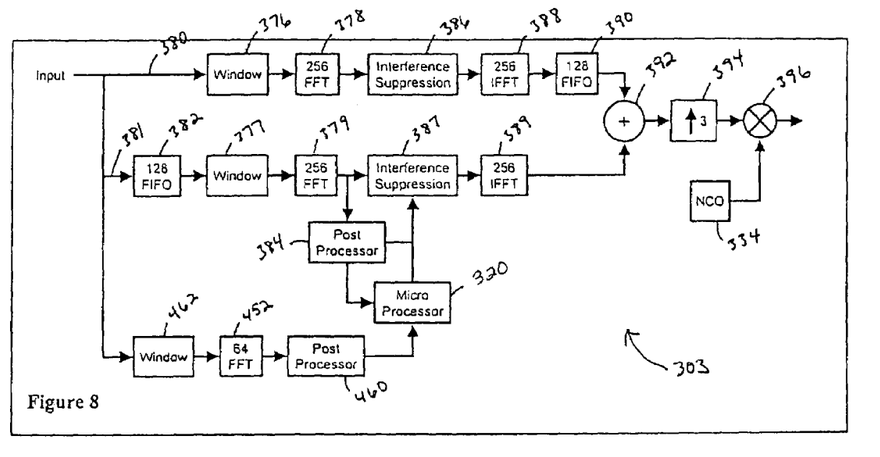
FIG. 8 is a block diagram of the FIX digital signal processing architecture and flow.

FIG. 8 is a block diagram of the FIX digital signal processing architecture and flow, as subsumed within the combination 303 of the L1/L2 frequency excision processing unit 314 and microcontroller 320 of FIG. 1. The FIX system as shown uses a two-channel 50-percent overlap FFT/IFFT excision scheme to apply excision to the narrowband interference in the band by removing selected FFT spectral bins, and a single channel FFT spectral analysis receiver. The windowed signal input 376, 377 to FIT processing 378, 379 is real and converted to complex in the FFT. Two complex FFT/IFFT channels 380, 381 are shown, where the second channel is delayed by a 128-point FIFO 382 equivalent to 50-percent of the 256-point FFT 379. The complex FFT functions 378, 379 move the signal from the time domain to the frequency domain. Both FFT/IFFT channels are windowed using a programmable Blackman-Harris windowing function to reduce spectral spreading, and passed through a 256-point FFT function 378, 379. The output of the 256-point FFT 379 is post-processed by post-processor 384 to determine narrowband interference signal content and thresholds, and to optimize the excision mask or function to be applied. The complex interference suppression blocks 386, 387 apply the excision mask or function to both channels and the modified spectra is then processed by 256-point complex IFFT functions 388, 389 back to a real signal in the time domain. A 128-point FIFO 390 restores the 50-percent delay in the leading channel and the two signals are combined by adder 392. Decimation/scaling unit 394 restores the signal level in the digital path and the signal is digitally mixed with the output of the NCO 334 by mixer 396 to the 70 MHz IF.

The functional block diagram of the FIX system as shown in FIG. 8 is a simplified top-level block diagram setting forth the general overlap-and-add technique used but not illustrating the detail of the actual circuit implementation employed within the GPS and M-code bandwidth application according to the present invention. For instance, to provide the necessary FFT/IFFT conversion time there are actually two transform engines used. A concept functionally using four FFT Engines and four IFFT Engines is used to satisfy the throughput requirement of 56 MHz continuous data. Details of each of the components are described below.

The configuration discussed uses the same hardware design for L1/L2. In the down converter 310 in FIG. 6, the L1 and L2 RF input signals are preselected by an L1/L2 diplexer 308 and amplified by low noise amplifiers. A frequency synthesizer develops the system frequencies from a reference crystal (18.66 MHz) and selects a local oscillator (LO) frequency to process L1 or L2 at the IF of 70 MHz. A series pair of SAW bandpass filters 366 sets the bandwidth of the processing channel. This signal is provided using a double-ended interface amplifier 367 to the ADC digitizer 312. The synthesizer 362 provides the LO for up conversion, and clocks for processing. The up converter 318 in FIG. 7 takes the output of the DAC 316 at the 70 MHz IF and filters the bandwidth using a series pair of SAW bandpass filters 366, then mixes the signal RF, and filters the RF using the L1/L2 diplexer 372.

Figure 9:
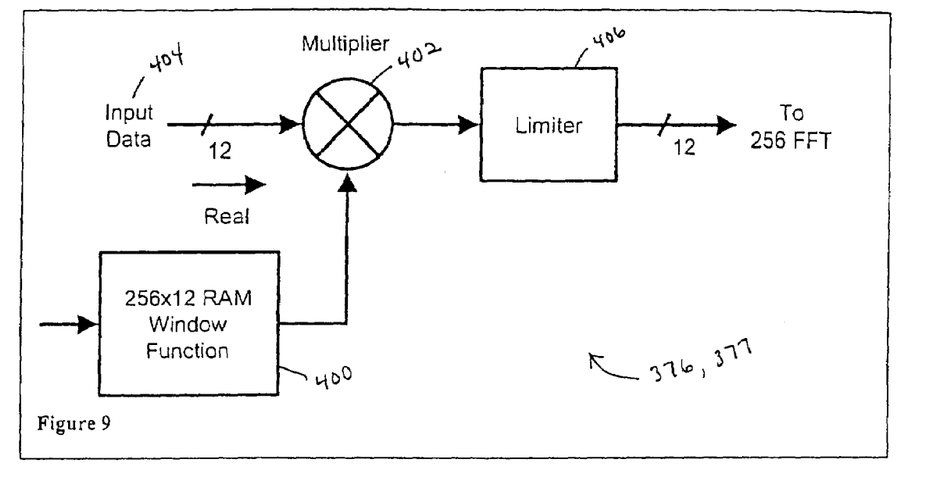
FIG. 9 is a block diagram of the windowing function in the FIX.

FIG. 9 is a block diagram of the windowing function 376, 377 in the FIX system. The windowing function is stored in RAM 400 allowing the function to be programmable. The FIX system uses a programmable Blackman-Harris window function stored in the look-up table RAM 400 and multiplied by numeric mixer 402 against the real input signal 404. The output is limited by limiter 406 and provided to the FFT/IFFT excision processing unit 314. RAM storage 400 of the windowing function allows the system to be programmed for the FIX application.

The windowing function may also be implemented by multiplying the input signal 404 by the windowing coefficients stored in a 256×12 ROM. The contents of this ROM contain the weighting factors associated with the window. The present invention uses a Blackman-Harris window function to reduce spectral spreading in the FFT. The programmability of the window function as a table driven weighting function will allow the FIX to apply Blackman, Hamming, Kaiser, cosine, etc. windows and combine these windows with equalization tapers and shapes for optimized signal spectral shaping.

Figure 10:
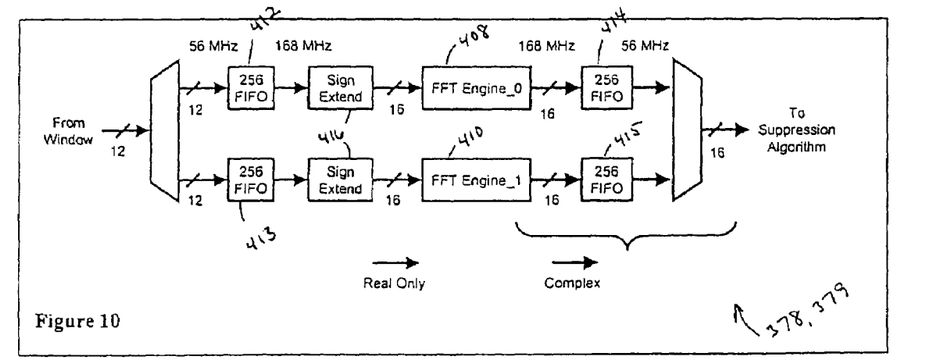
FIG. 10 is a block diagram of the FFT function.

A functional block diagram of the FFT function is shown in FIG. 10. This block diagram represents the single FFT 378, 379 shown in FIG. 8. Two FFT engines 408, 410 are used for each FFT function. These are indicated as FFT Engine0 408 and FFT Engine1 410 in the timing diagram. In addition, the FFTs run at three times the input clock rate of 56 MHz, i.e., at 168 MHz, to maintain the necessary throughput for real-time operation. As a result, FIFOs 412, 413, 414, 415 are used on both sides of the FFT Engines 408, 410 to provide rate matching. The input signal is a real data signal and the output of the FFT is complex. The IFFT function, shown in FIG. 12, looks similar except that the input is complex and the output is real. The FFT/IFFT Engines use 16-bit data and twiddle coefficients, and LSB padding is used to match the 12-bit input data to the 16-bit FFT computations, i.e., the four least significant bits (LSB) of the 12-bit input data are padded with zeros by sign extender 416.

Figure 11:
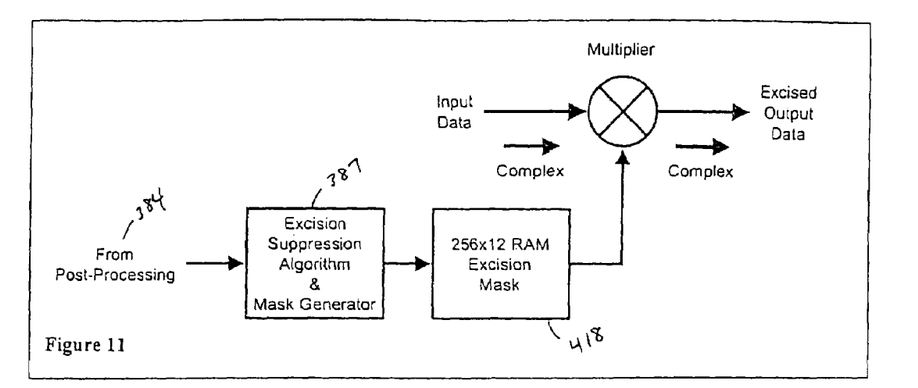
FIG. 11 is a block diagram of the interference suppression function in the FFT/IFFT process.

A functional block diagram of the excision function 314 is shown in FIG. 11. The excision mask or function is implemented by multiplying the FFT output by the excision mask coefficients stored in a 256×12 RAM storage area 418. The contents of this RAM are developed in post-processing and contain the weighting factors associated with the mask. The RAM provides the flexibility of providing a linear equalization applique to the signal, or a bin nulling applique. In other words, these contents can be used to null out a bin or series of bins, or may be dynamic values to attenuate or scale bin levels. The excised result is applied to the input of the IFFT 388, 389 for reconstruction with the interference suppressed. Suppression levels as high as 16-bit×6 dB/bit can ideally result in up to 96 dB of suppression. Frequency equalization can be applied by multiplying a frequency taper with the excision levels.

Figure 12:
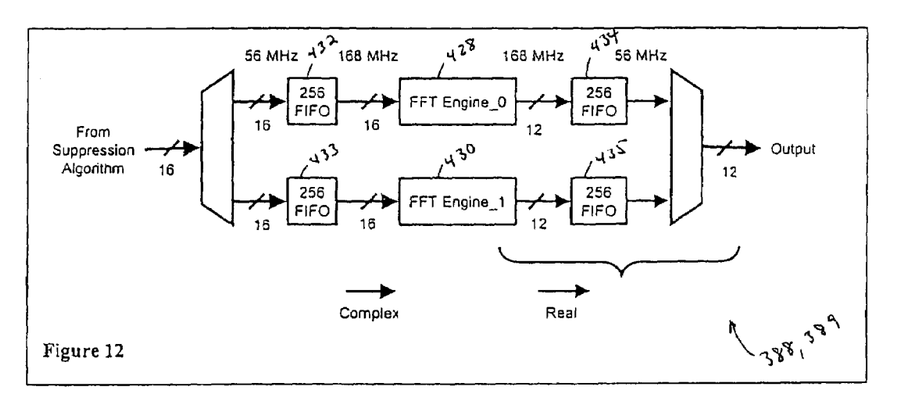
FIG. 12 is a block diagram of the IFFT function that is similar to the FFT function.

FIG. 12 is a block diagram of the IFFT function 388, 389 that is similar to the FFT function 278, 379. Two inverse FFT engines 428, 430 are used for each IFFT function. The processing runs at three times the sample rate using FIFOs 432, 433, 434, 435 to buffer the rates. Engines use 16-bit data with a 12-bit output. The input to the IFFT function is complex and the output is real.

Real-time processing requirements for the GPS signal processing require that the 256 FFT/IFFT conversion time support continuous data running at 56 MSPS. For a 256-point FFT/IFFT we have a conversion time:

$$256\text{-points}/56e6 = 4.571\ \mu\text{sec}$$

A typical FFT IP core function (e.g., the Altera FFT Mega-Core) requires 1106 clocks to compute the transform. Running the FFT Engine at 168 MHz yields a conversion time of:

$$1106\text{clocks}/168e6 = 6.583\ \mu\text{sec}$$

This does not include writing to or reading from the FFT Engine. As a result, the 4.571 μsec conversion time requires two FFT Engines to be used in a "ping-pong" mode of operation where one is computing a current transform while the other is inputting new data. Therefore, each FFT Engine has up to 4.571*2=9.143 μsec to process the data. These conversion times are for the FFT transform alone and do not include the writing and reading to and from the core, each of which take an additional 256 clocks. If we add these clocks to the 1106 clocks necessary for the transform we obtain a total of 1618 as the number of clock cycles needed. The processing time becomes $$1618\text{clocks}/168e6 = 9.631\ \mu\text{sec}$$

which exceeds the allowed 9.143 μsec. The actual number of clocks available is $$9.143\ \mu\text{sec} * 168e6 = 1536\text{clocks}.$$

Figure 13:
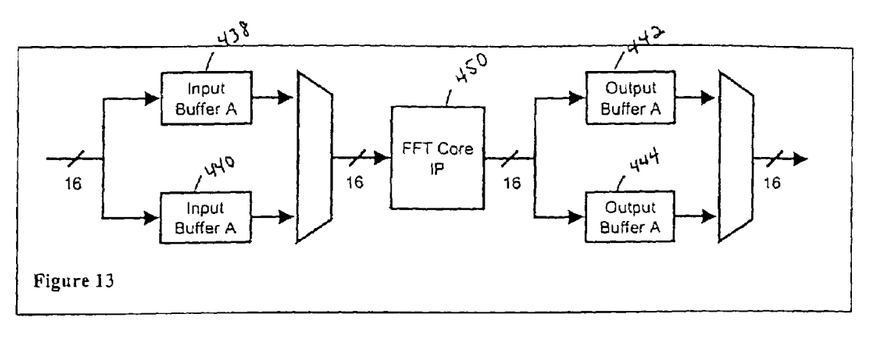
FIG. 13 is a block diagram of the FFT engine using a double-buffered approach.

As a result, a double buffering concept, as shown in FIG. 13, is used to provide additional buffering within the FFT Engine. FIG. 13 is a block diagram of the FFT engine using a double-buffered approach. Input buffers 438, 440 and output buffers 442, 444 are used on both the input and output sides, respectively, of the FFT core function 450 to overlap the data read out and read in periods of the function. As soon as the FFT core function 450 indicates that it is done, the buffers are switched, allowing a new transform to begin. This saves the 256 clocks used to read the data out of the FFT engine. 256 clocks are used to write to the core, thus yielding 1106+256=1362 clocks. The time used for processing is $$1362\text{clocks}/168e6 = 8.107\ \mu\text{sec}$$

This leaves 1536−1362=174 clocks available for overhead processing which translates to:

$$174\text{clocks}/168e6 = 1.036\ \mu\text{sec}$$

Figure 14:
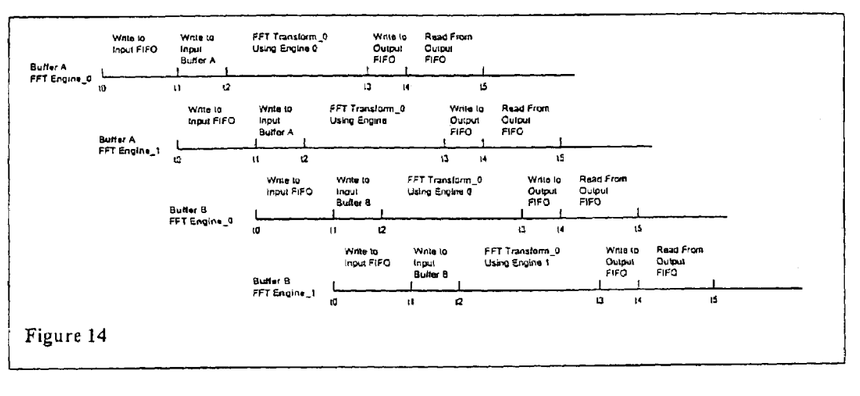
FIG. 14 is a timing diagram to illustrate the relationships of the two FFT engines relative to each other.

FIG. 14 is a timing diagram to illustrate the relationships of the two FFT Engines relative to each other. The two engines that make up each FFT of the two channel FFT are shown. The diagram illustrates the need to have two FFT Engines to keep up with the real-time data rate. The previous discussion illustrated how a total of four FFT Engines and four inverse FFT Engines are used to meet the GPS real-time throughput data requirement of 56 MSPS continuous data. The timing relationship illustrated in FIG. 14 shows the timing relationships of two FFT Engines relative to each other. These represent the two FFT Engines 408, 410 that make up a single FFT 378, 379 as shown in FIG. 8 and described above. Each FFT engine is shown on a separate line with the relative timing t0-t5.

At time t0 the new input data is written into the initial FIFO at the 56 MSPS input rate.

At time t1 the data is then read from the initial FIFO and written to an input buffer located within the FFT Engine at 168 MHz.

Between t2 and t3 the FFT transform is performed.

Between t3 and t4 the output of the FFT transform is read from the FFT Engine and written into the output FIFO.

Between t4 and t5 the data is converted back to 56 MHz using the output FIFO.

As soon as the FFT Engine is finished processing the transform at time t3, the FFT is ready to start another transform (after some overhead setup clocks). This is possible because of the two output buffers 442, 444, shown in FIG. 13. To understand this we can look at the first and third lines in FIG. 14 which both represent the timing for Engine_0. As mentioned, t3 on the top line indicates the FFT has finished the transform, the output can be read, and another transform can be started. However, the process waits until the input buffer has been filled before it starts the transform, t2 on the third line. The timing diagram illustrates how the two FFT engines keep up with the real-time data rate.

A smaller analysis 64-point FFT receiver 452 (FIG. 8) is used in the system to monitor the interference environment and to close the loop on the control signals for the broadband portion of the integrated ISU/FIX system. A smaller FFT is utilized for detection and control to increase the loop bandwidth of this portion of the system by a factor of four. The analysis FFT is intended to monitor the broadband components of the environment and to mask out the narrowband interference signals excised by the FIX function. The statistical properties of the residual signal are evaluated to establish operating properties and apply decision thresholds on spectral bins. Alternate variable resolution analysis receiver 452 solutions using a larger 128-point or 256-point FFT receiver can provide finer narrowband signal masking resolution for broadband detection when system response speed or dynamics allow a slower process. Some implementation efficiency can be realized if the pipeline 256-point FFT 378 is shared for the broadband detection process. The larger data sample and potential limits in synchronization or the START signal (see FIG. 15) can slow the broadband detection process.

Figure 15:
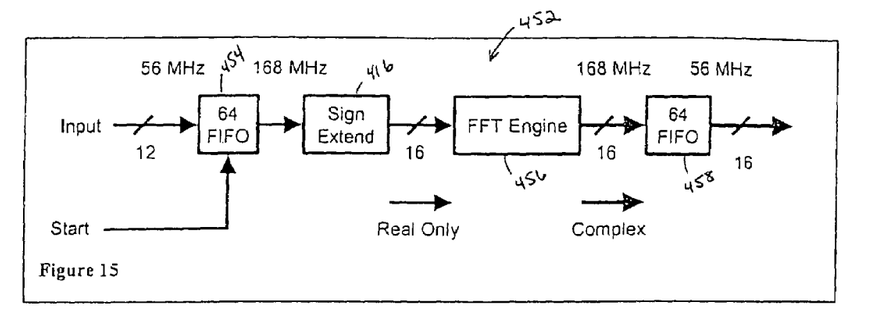
FIG. 15 is a block diagram of the 64-point FFT analysis receiver of FIG. 8.

FIG. 15 is a block diagram of the 64-point FFT analysis receiver 452 of FIG. 8. The 64-bin receiver is a snapshot processor that evaluates the spectral content of the input data signal at a lower resolution than the pipeline FFT/IFFT channels. More particularly, the transform is periodically started upon command (START signal shown in the diagram). Data is not written until the START signal occurs. Once START is detected, the data is written into the input FIFO 454. This takes 64 clocks at the 56 MSPS rate or $$64/56e6 = 1.143\ \mu\text{sec}.$$

After this buffer is full, the data is then written into a 64-point FFT core function 456. The FFT core function 456 performs the transform and outputs the data. The lower resolution spectral definition of the signal is used to develop the control signals for broadband detection and suppression. The smaller FFT is used to support a higher control loop bandwidth compatible with platform dynamics.

The FFT core 456 takes 261 clocks to compute the transform. As a result, the ideal minimum required latency from the start of writing data to the FFT until the ability to read data out of the FFT through FIFO 458 is:

$$\text{Clocks} = 64 \text{ (from input buffer to } FFT) +$$
$$261 \text{ } (FFT \text{ transform}) + \sim 32 \text{ (overhead)}$$
$$= 357 \text{ clocks}$$

This translates to a minimum latency relative to the START pulse of $$357/168e6 = 2.125 \text{ } \mu\text{sec.}$$

Therefore the total time relative to the START pulse is then the sum of these two times:

Total time=1.143 μsec+2.125 μsec=3.268 μsec

This represents the time from the detection of START until the first data of the FFT starts to be read out. There are 32 clocks allowed as overhead for control of the blocks. If this number increases, then the minimum latency also increases. Similarly, if this number decreases the minimum latency also decreases.

The block diagram of FIG. 15 may preferably be modified to include a 128-point or 256-point FFT instead of the 64-point FFT. The 128-point or 256-point FFT has been found to give finer masking resolution in broadband/narrowband signal environments.

Figure 16:
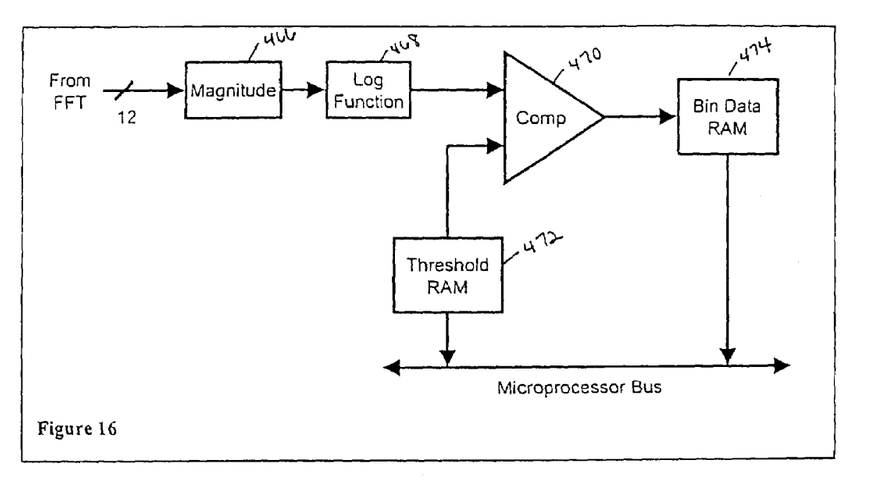
FIG. 16 is a block diagram of the post-processor used to filter data between the real-time processing and the microprocessor control.

FIG. 16 is a block diagram of the post-processor 460 used to filter data between the real-time processing through windowed signal input 462 and the microprocessor controller 320, minimizing the amount of data presented to the microcontroller. Decisions and thresholds generally utilize decibels (dB), therefore the monitor and decisions process converts measured spectral values. The post-processor contains a magnitude calculator 466, a logarithm function 468, a threshold comparator 470 and a bin data RAM 474. Bins that exceed the value stored in the threshold RAM 472 are then stored in the bin data RAM 474 for further processing by the microprocessor 320. The post-processor generates a simplified and rapid decision on the presence of narrowband interference.

In sum, the step of suppressing residual wideband interference in the GPS signal includes a serially cascaded dual-port broadband interference suppression technique preceding the narrowband excision process and using an additional bank of a sampling FFT process. A masked variable resolution FFT receiver monitors the residual broadband signal in a band of the signal environment, and removes the excised narrowband signals from the monitored residual signal. Using a variable resolution FFT total energy monitor process, compatible with the platform dynamics, that can operate at a higher rate and control loop bandwidth than the narrowband excision process, a total broadband interference residual energy measurement is processed to provide control commands and signals to cascaded broadband suppression in each band of interest, with a control algorithm iteratively excising and suppressing narrowband and broadband interference in the signal environment.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for suppressing narrowband interference in global positioning satellite (GPS) navigation and communication bands, comprising:
   inputting a digitized global positioning satellite signal to a fast Fourier transform (FFT) to produce a plurality of contiguous frequency bins;
   examining said frequency bins to identify those bins containing narrowband interference above an excision threshold as excise bins;
   excising said excise bins to leave residual bins;
   implementing a lower resolution FFT analysis receiver to monitor broadband components and to mask out the narrowband interference excised in the excising step;
   reconstructing the global positioning satellite signal with said residual bins using an inverse fast Fourier transform (IFFI); and
   outputting said reconstructed signal to a receiver as a protected global positioning satellite signal having improved signal characteristics through reduced narrowband interference, said protected global positioning satellite signal being used to produce enhanced global positioning satellite operation in said receiver.

2. The method as set forth in claim 1, wherein the step of implementing comprises suppressing residual wideband interference in the global positioning satellite signal.

3. The method of claim 1, wherein inputting the digitized global positioning satellite signal to the FFT comprises inputting the digitized global-positioning satellite signal to the FFT in a first channel, the method further comprises:
   including a second channel for signal processing;
   including a broadband suppression algorithm in the signal processing, wherein a broadband dual-port technique precedes the digital excision technique; and
   iteratively and alternately processing between narrowband optimization and broadband optimization.

4. A method for suppressing narrowband interference in global positioning satellite navigation and communication bands, comprising:
   down-converting an incoming global positioning satellite signal to an intermediate frequency (IF) signal;
   digitizing said intermediate frequency signal using an analog-to-digital converter;
   inputting said digitized signal to a fast Fourier transform to produce a plurality of contiguous frequency bins;
   examining said frequency bins to identify those bins containing narrowband interference above an excision threshold as excise bins;
   excising said excise bins to leave residual bins;
   implementing a lower resolution FFT analysis receiver to monitor broadband components and to mask out the narrowband interference excised in the excising step;
   reconstructing the global positioning satellite signal with said residual bins using an inverse fast Fourier transform;
   up-converting said reconstructed signal; and
   outputting said up-converted signal to a receiver as a protected global positioning satellite signal having improved signal characteristics through reduced narrowband interference, said protected global positioning satellite signal being used to produce enhanced global positioning satellite operation in said receiver.

5. The method as set forth in claim 4, further comprising the step of suppressing residual wideband interference in the global positioning satellite signal with a serial cascade of dual-port broadband interference suppression process prior to said steps of examining and excising.

6. The method as set forth in claim 5, wherein inputting said digitized signal to the fast Fourier transform comprises inputting said digitized signal to the fast Fourier transform in a first channel, and wherein said step of suppressing residual wideband interference includes the steps of:
    monitoring a residual broadband signal in a band of the signal environment using a sampling fast Fourier transform processor in a second channel;
    removing the narrowband signal excise bins from the monitored residual signal;
    processing a total residual broadband interference energy measurement to provide control commands and signals to cascaded broadband suppression in each band of interest; and
    iteratively excising and suppressing narrowband and broadband interference in the signal environment using a control algorithm.

7. The method of claim 4, wherein inputting said digitized signal to a fast Fourier transform comprises inputting said digitized signal to the FFT in a first channel, the method further comprising:
    including a second channel for signal processing; and
    including a broadband suppression algorithm in the signal processing, wherein the broadband dual-port technique precedes the digital excision technique; and iteratively and alternately processing between narrowband optimization and broadband optimization.

8. A narrowband interference excision and nulling system, comprising:
    first bank of narrowband filters utilizing a continuous fast Fourier transform process on an incoming digitized signal containing a signal of interest to produce a plurality of contiguous frequency bins for each of a first channel and a second channel;
    a frequency excision processing unit for determining which of said frequency bins to excise based upon an excision threshold computed using bin and band statistical parameters with a narrowband mask, and for excising the determined bins;
    a lower resolution analysis FFT receiver to monitor broadband components and to mask out narrowband interference signals excised by the frequency excision processing unit;
    a post-processor to determine narrowband interference signal content output from the second channel; and
    a second bank of narrowband filters utilizing an inverse fast Fourier transform process to reconstruct said signal of interest for each of the first channel and the second channel, said reconstructed signal having improved signal characteristics through reduced narrowband interference therein.

9. The system as set forth in claim 8, wherein said frequency excision processing unit uses a linear inverse matrix multiply to excise the determined bins based on the multiplication of coefficients derived to excise, attenuate or equalize the bins.

10. The system as set forth in claim 8, further comprising:
    an L1/L2 down-converter for converting an incoming global positioning satellite signal to an intermediate frequency signal; and
    an analog-to-digital converter for digitizing said intermediate frequency signal for input to said first banks of narrowband filters.

11. The system as set forth in claim 8, further comprising:
    a digital-to-analog converter for converting said reconstructed signal of interest to analog format; and
    an L1/L2 up-converter for converting said analog format signal to a radio frequency (RF) signal for output to said receiver.

12. The system as set forth in claim 8, further comprising a broadband interference suppression unit.

13. The system as set forth in claim 10, wherein said broadband interference suppression unit and said frequency excision processing unit are integrated.

14. The system as set forth in claim 12, wherein said broadband interference suppression unit includes an analysis fast Fourier transform receiver for monitoring a residual broadband signal in a band of the signal environment and masking out excised narrowband bins from the monitored residual broadband signal.

15. The system as set forth in claim 8, further comprising a serially cascaded dual-port broadband interference suppression processor preceding the frequency excision processing unit.

* * * * *

UNITED STATES PATENT AND TRADEMARK OFFICE
CERTIFICATE OF CORRECTION

| | | |
|---|---|---|
| PATENT NO. | : 7,660,374 B2 | Page 1 of 1 |
| APPLICATION NO. | : 11/133225 | |
| DATED | : February 9, 2010 | |
| INVENTOR(S) | : Casabona et al. | |

It is certified that error appears in the above-identified patent and that said Letters Patent is hereby corrected as shown below:

On the Title Page, Item (75) under inventors, please replace "Paralppany" with --Parsippany--

At Claim 8, Column 15, Line 33, please add --a-- before the word first

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,374 B2  Page 1 of 1
APPLICATION NO. : 11/133225
DATED : February 9, 2010
INVENTOR(S) : Casabona et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Thirtieth Day of November, 2010

David J. Kappos
*Director of the United States Patent and Trademark Office*